US012140986B2

(12) United States Patent
Zhang et al.

(10) Patent No.: US 12,140,986 B2
(45) Date of Patent: Nov. 12, 2024

(54) LOW DROPOUT REGULATOR AND CONTROL METHOD

(71) Applicant: Halo Microelectronics International, Campbell, CA (US)

(72) Inventors: Gangqiang Zhang, Plano, TX (US); Zhao Fang, Plano, TX (US); Wenchao Qu, Plano, TX (US)

(73) Assignee: Halo Microelectronics International, Campbell, CA (US)

( * ) Notice: Subject to any disclaimer, the term of this patent is extended or adjusted under 35 U.S.C. 154(b) by 231 days.

(21) Appl. No.: 17/809,768

(22) Filed: Jun. 29, 2022

(65) Prior Publication Data

US 2024/0004412 A1 Jan. 4, 2024

(51) Int. Cl.
*G05F 1/59* (2006.01)
*G05F 3/26* (2006.01)

(52) U.S. Cl.
CPC ................ *G05F 1/59* (2013.01); *G05F 3/262* (2013.01)

(58) Field of Classification Search
CPC ..... G05F 1/00; G05F 1/10; G05F 1/40; G05F 1/46; G05F 1/461; G05F 1/468; G05F 1/56; G05F 1/561; G05F 1/562; G05F 1/563; G05F 1/5735; G05F 1/575; G05F 1/59; G05F 1/595; G05F 1/613; G05F 1/614; G05F 1/618; G05F 3/02; G05F 3/08; G05F 3/16; G05F 3/185; G05F 3/20; G05F 3/22; G05F 3/222; G05F 3/24; G05F 3/242; G05F 3/26; G05F 3/262; G05F 3/265; G05F 3/267; H02M 3/156
USPC ................ 323/223–226, 266, 269–275, 280, 323/282–286, 304, 311–317, 351; 327/538–543
See application file for complete search history.

(56) References Cited

U.S. PATENT DOCUMENTS 9,018,576 B2 * 4/2015 Gong ........................ G05F 1/10 250/214 R
2008/0029846 A1 * 2/2008 Itoh ........................... G05F 1/56 257/E23.079
2010/0052635 A1 * 3/2010 Wang ...................... G05F 1/575 323/280
2022/0171417 A1 * 6/2022 Fiocchi .................. G05F 1/575

FOREIGN PATENT DOCUMENTS

CN 213634248 U * 7/2021

OTHER PUBLICATIONS

English translation of CN-213634248-U. (Year: 2021).*

* cited by examiner

*Primary Examiner* — Thienvu V Tran
*Assistant Examiner* — Carlos O Rivera-Perez
(74) *Attorney, Agent, or Firm* — AP3 Law Firm PLLC

(57) ABSTRACT

A low dropout regulator includes a first transistor having a first drain/source terminal coupled to an input terminal of a regulator, and a second drain/source terminal coupled to an output terminal of the regulator, a second transistor having a first drain/source terminal coupled to the input terminal of the regulator, and a second drain/source terminal coupled to the output terminal of the regulator through a resistor, and an error amplifier having an inverting input configured to receive a reference, a non-inverting input configured to detect an output voltage of the regulator, and an output coupled to gates of the first transistor and the second transistor.

17 Claims, 6 Drawing Sheets

LOW DROPOUT REGULATOR AND CONTROL METHOD

TECHNICAL FIELD

The present invention relates to a low dropout regulator, and, in particular embodiments, to a control apparatus for the low dropout regulator.

BACKGROUND

As technologies further advance, a variety of portable devices, such as mobile phones, tablet PCs, digital cameras, MP3 players and/or the like, have become popular. Each portable device comprises a variety of integrated circuit devices such as central processing units (CPUs), graphics processing units (GPUs), application specific integrated circuits (ASICs), memory chips and the like.

For reducing power consumption, the integrated circuit devices are fabricated with semiconductor processes that operate at low voltages (e.g., 1.2 volts, 1.8 volts and the like). However, the portable device is supplied with higher voltages (e.g., 5 volts, 12 volts and the like). Various power conversion systems and/or devices are employed to convert the supply voltage into suitable voltages for providing power to the integrated circuit devices.

Among the power conversion systems, low dropout (LDO) regulators are widely used in different output voltage domains due to various advantages such as less peripheral components, low output noise, low output ripple, a simple circuit structure and the like.

FIG. 1 illustrates a schematic diagram of a conventional LDO regulator. The LDO regulator comprises a transistor M1, a first feedback resistor RFB1, a second feedback resistor RFB2 and an error amplifier EA. In operation, the input of the LDO regulator is connected to an input power source coupled to an input terminal VIN. The LDO regulator is configured to provide power to a load. RL is employed to represent the load coupled to the output terminal Vo of the LDO regulator. In order to have a steady output voltage, an output capacitor CL is connected in parallel with RL as shown in FIG. 1.

As shown in FIG. 1, the transistor M1 is implemented as a p-type transistor. The source of the transistor M1 is coupled to the power supply terminal of the LDO regulator. The drain of the transistor M1 is coupled to the output terminal of the LDO regulator. RL and CL are connected in parallel between the output terminal and ground.

The first feedback resistor RFB1 and the second feedback resistor RFB2 form a voltage divider connected between the output terminal Vo of the LDO regulator and ground. The non-inverting input of the error amplifier EA is connected to a common node of the first feedback resistor RFB1 and the second feedback resistor RFB2. The inverting input of the error amplifier EA is configured to receive a predetermined reference VREF. In operation, the error amplifier EA is configured to detect the output voltage of the LDO regulator. Based on the detected voltage, the error amplifier EA controls the operation of the transistor M1 so as to achieve a regulated output voltage at the output terminal Vo of the LDO regulator.

The LDO regulator includes two poles. A first pole is formed by the high impedance output resistance of the error amplifier EA and the parasitic gate capacitance of the transistor M1. The frequency of the first pole of the LDO regulator can be expressed as:

$$f_{p1} = \frac{1}{2\pi C_{p1} \times r_{o1}} \tag{1}$$

In Equation (1), $f_{P1}$ is the frequency of the first pole. $C_{P1}$ is the capacitance value of the parasitic gate capacitance of the transistor M1, and $r_{o1}$ is the resistance value of the output resistance of the error amplifier EA.

A second pole is formed by the output equivalent resistance RL and the output capacitor CL. The frequency of the second pole can be expressed as:

$$f_{p2} = \frac{1}{2\pi C_L \times R_L} \tag{2}$$

In Equation (2), $f_{P2}$ is the frequency of the second pole. $C_L$ is the capacitance value of the output capacitor CL. $R_L$ is the resistance value of the equivalent resistor RL.

From Equation (1) and Equation (2), when the current of the load connected to the output terminal Vo of the LDO regulator is small (the resistance value $R_L$ is large), the large $R_L$ lowers the frequency of the second pole. On the other hand, the transistor M1 may be implemented as a large transistor having a large parasitic capacitance ($C_{p1}$) value. In addition, the error amplifier EA may be implemented as a low quiescent current amplifier having a large output resistance ($r_{o1}$) value. In consideration with the factors above, the frequency $f_{P1}$ of the first pole is closer to the frequency $f_{P2}$ of the second pole. In addition, the load of the LDO regulator may vary in a wide range. The load variation causes the frequency of the second pole to change in a wide frequency range. In order to ensure the stability of the feedback loop of the LDO regulator under different load conditions, it is necessary to perform stability compensation on the circuit of the LDO regulator.

In the prior art, in applications where the requirement for the output voltage accuracy of the LDO regulator is not very high (e.g., the built-in LDO module in an integrated chip), a zero with a fixed frequency can be added by connecting a resistor in series at the output terminal to compensate the stability of the LDO regulator.

FIG. 2 illustrates a schematic diagram of a conventional LDO with a compensation circuit. The LDO regulator shown in FIG. 2 is similar to that shown in FIG. 1 except that a resistor R1 is connected between the drain of the transistor M1 and the output terminal Vo. After R1 has been added into the LDO regulator, the transfer function from the output of the error amplifier EA to the non-inverting input (V+) of the error amplifier EA can be expressed as:

$$\frac{V_+}{\Delta v} = gm \cdot \left(R1 + \frac{1}{sC_L}\right) \cdot \frac{RFB2}{RFB1 + RFB2} \tag{3}$$

In Equation (3), gm is the transconductance of the transistor M1. Av is the voltage at the output of the error amplifier EA. After R1 has been added into the LDO regulator, a zero is formed by R1 and CL. The frequency of the zero can be expressed as:

$$f_{Z1} = \frac{1}{2\pi C_L \times R1} \quad (4)$$

Through the selection of circuit parameters (e.g., the value of R1), the frequency of the introduced zero can be exactly located near the frequency of the first pole so as to compensate for it and achieve the stability of the feedback loop.

The advantage of the compensation apparatus and method discussed above with respect to FIG. 2 is that the circuit is simple and easy to implement. In addition, the frequency of the first pole of the LDO regulator does not change with the load. As such, the zero shown in Equation (4) can effectively compensate the first pole.

As shown in FIG. 2, the resistor R1 is connected in series between the transistor M1 and the output capacitor CL. After R1 has been added into the LDO regulator, the voltage sampled by the voltage divider is no longer the voltage value at the output terminal Vo. This causes the value of the output voltage to be inaccurate and vary with the output current. In most LDO applications in the integrated circuits, the output voltage error caused by this compensation structure is acceptable, so this simple zero compensation circuit shown in FIG. 2 can be used.

In some applications, the circuit shown in FIG. 2 is not a good solution because the area occupied by R1 is too large. In some applications, if the frequency of the zero needs to be the same as the frequency of the first pole, R1 needs to take a small resistance value (e.g., 1 ohm). A resistor with such a small resistance value occupies too much area in the integrated chip, which increases the cost of the integrated chip. It is desirable to have a simple and accurate apparatus and control method to perform the compensation function described above with respect to FIG. 2.

SUMMARY

These and other problems are generally solved or circumvented, and technical advantages are generally achieved, by preferred embodiments of the present disclosure which provide a control apparatus for a low dropout regulator.

In accordance with an embodiment, an apparatus comprises a first transistor having a first drain/source terminal coupled to an input terminal of a regulator, and a second drain/source terminal coupled to an output terminal of the regulator, a second transistor having a first drain/source terminal coupled to the input terminal of the regulator, and a second drain/source terminal coupled to the output terminal of the regulator through a resistor, and an error amplifier having an inverting input configured to receive a reference, a non-inverting input configured to detect an output voltage of the regulator, and an output coupled to gates of the first transistor and the second transistor.

In accordance with another embodiment, a method comprises configuring a low dropout (LDO) regulator to convert an input voltage into a regulated output voltage, wherein the LDO regulator comprises a first transistor coupled between an input terminal and an output terminal of the LDO regulator, a second transistor coupled to the input terminal directly and coupled to the output terminal through a resistor, and an error amplifier configured to control the first transistor and the second transistor so as to achieve the regulated output voltage, configuring the first transistor and the second transistor such that a current flowing through the first transistor is N times greater than a current flowing through the second transistor, and configuring the resistor and an output capacitor to form a zero to compensate a pole of the LDO regulator.

In accordance with yet another embodiment, a regulator comprises a first transistor having a source coupled to an input terminal of the regulator, and a drain coupled to an output terminal of the regulator, a second transistor having a source coupled to the input terminal of the regulator, and a drain coupled to the output terminal of the regulator through a resistor, an output capacitor coupled between the output terminal of the regulator and ground, wherein the resistor and the output capacitor form a zero to compensate a pole of the regulator, and an error amplifier having an inverting input configured to receive a reference, a non-inverting input configured to detect an output voltage of the regulator, and an output coupled to gates of the first transistor and the second transistor.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a control apparatus for a low dropout regulator. The invention may also be applied, however, to a variety of power regulators. Hereinafter, various embodiments will be explained in detail with reference to the accompanying drawings.

Figure 3:
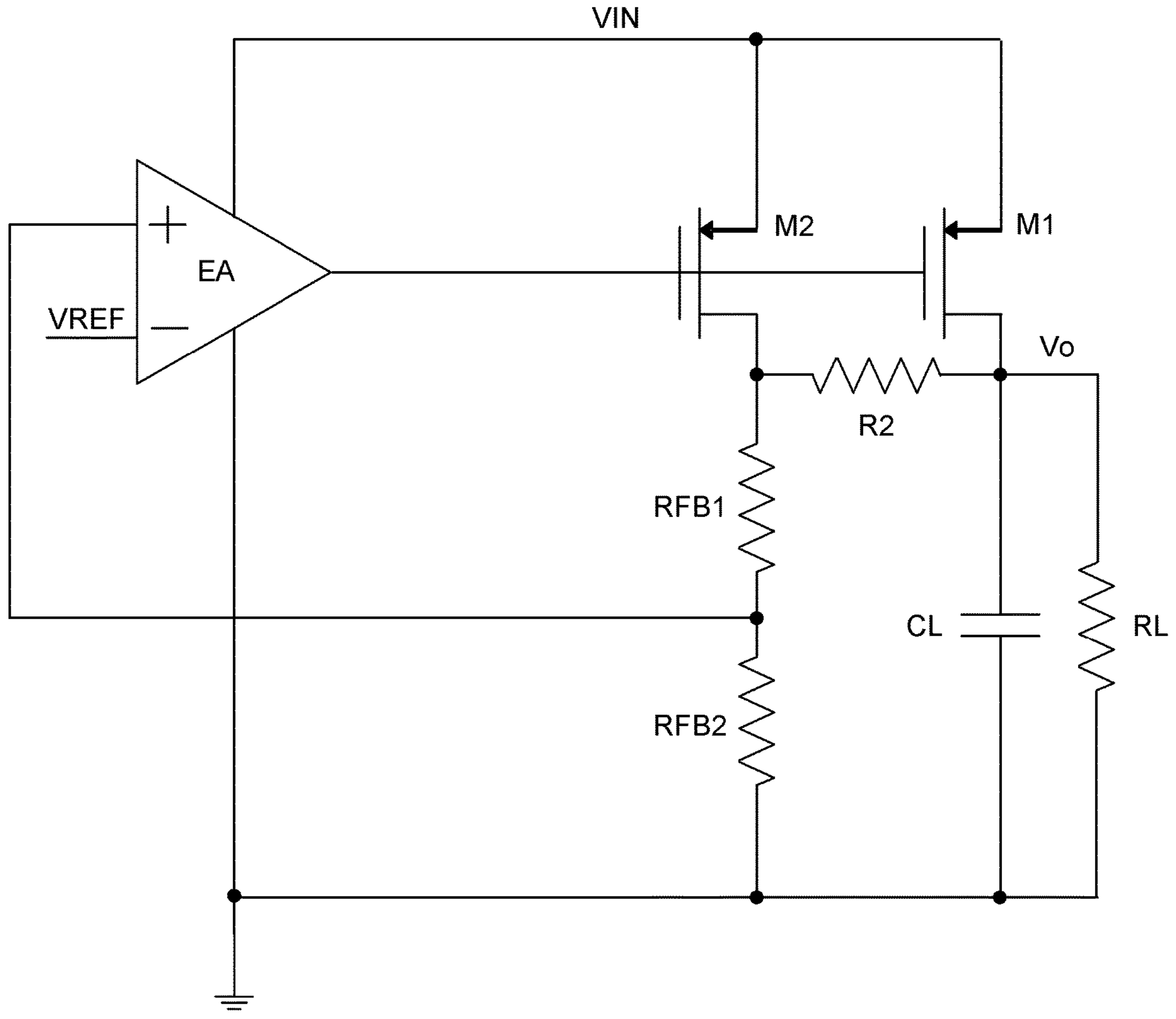
FIG. 3 illustrates a schematic diagram of a first implementation of an LDO regulator and its associated control apparatus in accordance with various embodiments of the present disclosure.

FIG. 3 illustrates a schematic diagram of a first implementation of an LDO regulator and its associated control apparatus in accordance with various embodiments of the present disclosure. The LDO regulator comprises a first transistor M1, a second transistor M2, a first feedback resistor RFB1, a second feedback resistor RFB2, a resistor R2 and an error amplifier EA. In operation, the LDO regulator is configured to be coupled to an input power source through an input terminal VIN and provide power to a load coupled to an output terminal Vo. RL is employed to represent the load coupled to the output terminal Vo of the LDO regulator. In order to have a steady output voltage, an output capacitor CL is connected in parallel with RL as shown in FIG. 3.

In some embodiments, a first drain/source terminal of the first transistor M1 is coupled to the input terminal of the LDO regulator. A second drain/source terminal of the first transistor M1 is coupled to the output terminal of the LDO regulator. As shown in FIG. 3, the first transistor M1 is a first p-type transistor. The first drain/source terminal of the first transistor M1 is a source terminal of M1. The second drain/source terminal of the first transistor M1 is a drain terminal of M1.

In some embodiments, a first drain/source terminal of the second transistor M2 is coupled to the input terminal of the LDO regulator. A second drain/source terminal of the second transistor M2 is coupled to the output terminal of the LDO regulator through the resistor R2. As shown in FIG. 3, the second transistor M2 is a second p-type transistor. The first drain/source terminal of the second transistor M2 is a source terminal of M2. The second drain/source terminal of the second transistor M2 is a drain terminal of M2.

As shown in FIG. 3, an inverting input of the error amplifier EA is configured to receive a reference VREF. A non-inverting input of the error amplifier EA is configured to detect the output voltage of the LDO regulator. More particularly, the non-inverting input of the error amplifier EA detects the output voltage of the LDO regulator through the resistor R2 and the voltage divider formed by RFB1 and RFB2. An output of the error amplifier EA is connected to gates of the first transistor M1 and the second transistor M2.

The resistor R2 and the output capacitor CL form a zero to compensate a first pole of the LDO regulator. The first pole of the LDO regulator is formed by the output resistance of the error amplifier EA and the input capacitance of the first transistor M1. The frequency of the first pole of the LDO regulator is the same as that shown in Equation (1). In some embodiments, in order to compensate the first pole, the frequency of the zero formed by R2 and CL is set to be equal to the frequency of the first pole. Alternatively, the frequency of the zero formed by R2 and CL is set to be close to the frequency of the first pole. In other words, the frequency of the zero formed by R2 and CL is approximately equal to the frequency of the first pole (e.g., within a predetermined range such as +/−10%).

Figure 1:
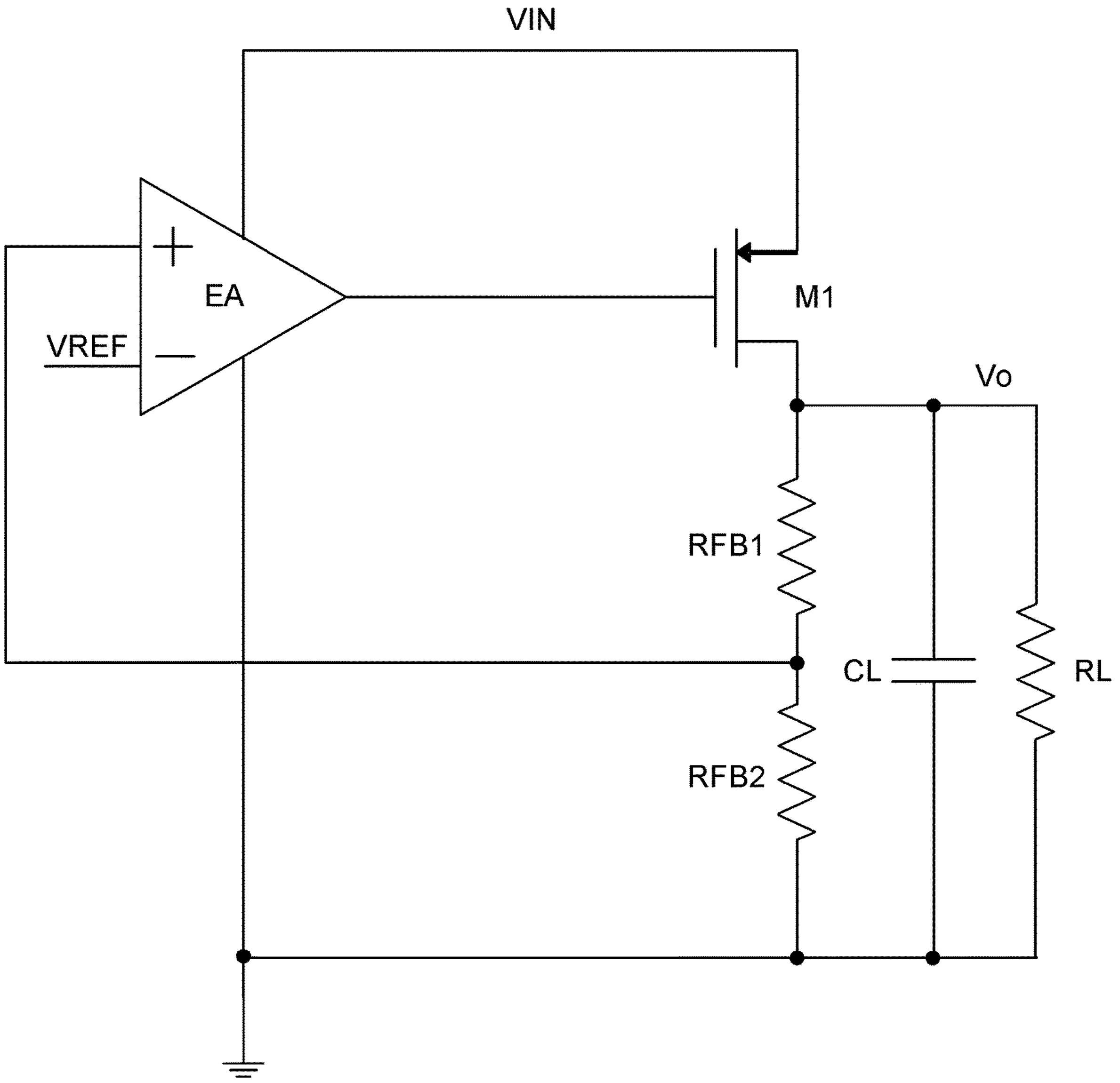
Figure 1 (Prior Art)
FIG. 1 illustrates a schematic diagram of a conventional LDO regulator.
Figure 2:
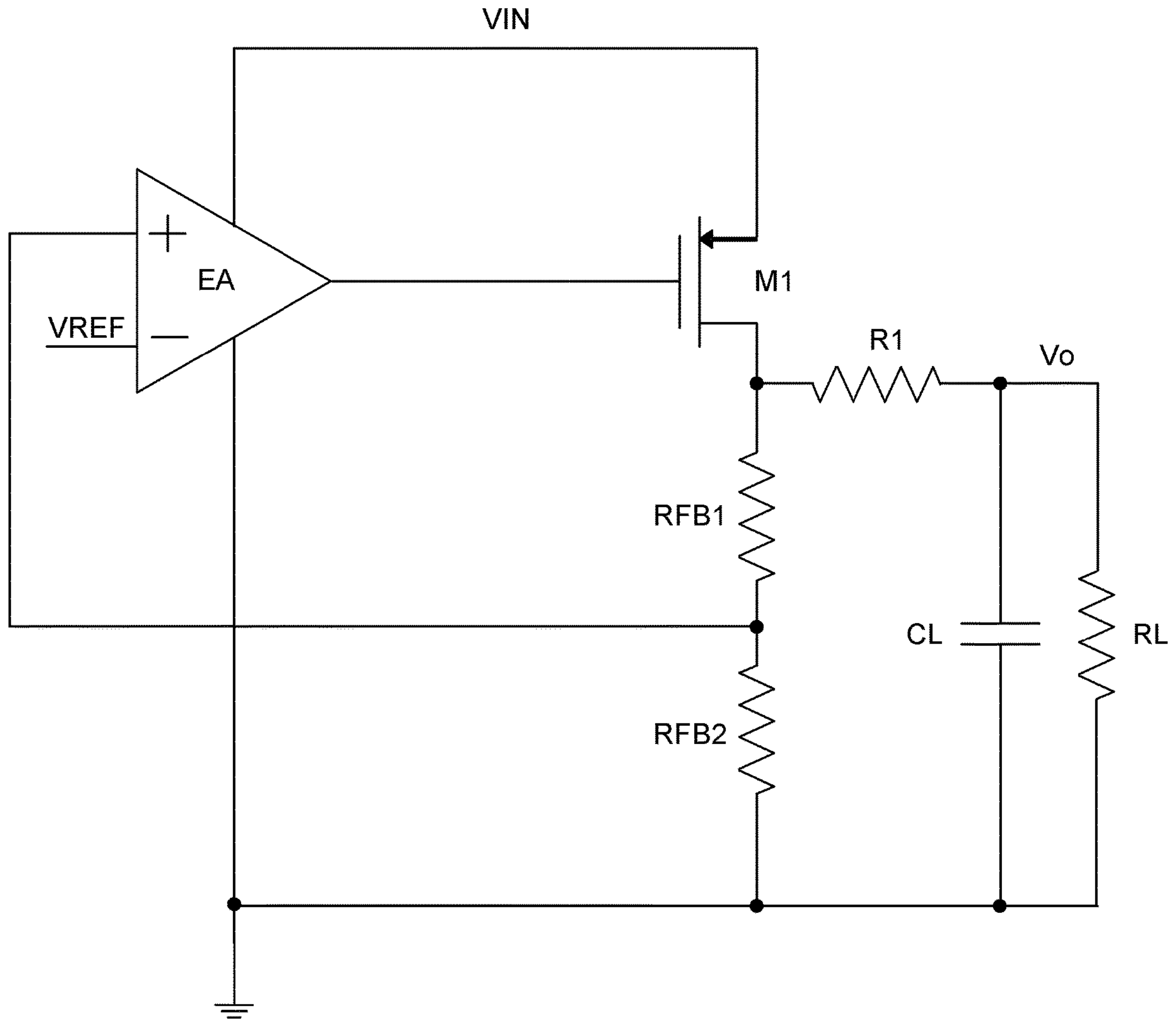
Figure 2 (Prior Art)
FIG. 2 illustrates a schematic diagram of a conventional LDO with a compensation circuit.

In comparison with the LDO regulator shown in FIGS. 1-2, the single transistor has been replaced by two transistors in FIG. 3. The resistor R2 is coupled between these two transistors. In some embodiments, the first transistor M1 is a large transistor, and the second transistor M2 is a small transistor. A ratio of the size of M1 to the size of M2 is N:1. N is a predetermined number greater than 1.

As shown in FIG. 3, the first transistor M1 is directly connected to the output terminal and the load. The second transistor M2 is directly connected to the voltage divider formed by RFB1 and RFB2. At the same time, the second transistor M2 is connected to the output terminal Vo and the load through the resistor R2. In some embodiments, the total area occupied by transistors M1 and M2 is the same as that in the conventional LDO regulator shown in FIGS. 1-2.

As shown in FIG. 3, the source of M1 is directly connected to the source of M2. The gate of M1 is directly connected to the gate of M2. According to the ratio of the size of M1 to the size of M2, a ratio of a current flowing through the first transistor M1 to a current flowing through the second transistor M2 is equal to (N:1).

In operation, after the resistor R2 has been added between transistors M1 and M2, the transfer function from the output of the error amplifier EA to the non-inverting input end V+ of the error amplifier EA can be expressed as:

$$V_+ = (V_{R2} + V_O) \cdot \frac{RFB2}{RFB1 + RFB2} \tag{5}$$

In Equation (5), $V_{R2}$ can be expressed as:

$$V_{R2} = gm \cdot \Delta v \cdot \frac{1}{N} \cdot R2 \tag{6}$$

In Equation (6), Δv is the voltage at the output of the error amplifier EA.

In Equation (5), $V_o$ can be expressed as:

$$V_o = \left(gm \cdot \Delta v + gm \cdot \Delta v \cdot \frac{1}{N}\right) \cdot \frac{1}{sC_L} \tag{7}$$

In consideration with Equations (6) and (7), the transfer function shown in Equation (5) can be expressed as:

$$\frac{V_+}{\Delta v} = \frac{gm}{N} \cdot \left(R2 + \frac{N+1}{sC_L}\right) \cdot \frac{RFB2}{RFB1 + RFB2} \tag{8}$$

In Equation (8), gm is the transconductance of the transistor M1. As indicated by Equation (8), R2 and CL form a zero. After R2 has been added into the LDO regulator shown in FIG. 3, a zero is formed by R2 and CL. The frequency of the zero can be expressed as:

$$f_{Z2} = \frac{N+1}{2\pi CL \times R2} \tag{9}$$

In operation, when R2 is equal to (N+1)×R1, the frequency $f_{Z2}$ of the zero in Equation (9) is the same as the frequency $f_{Z1}$ of the zero in Equation (4). In other words, the same compensation function has been realized. However, the resistance value of the resistor R2 in the circuit shown in FIG. 3 is (N+1) times greater than that of R1. The current flowing through R2 is 1/N of the current flowing through R1. The area occupied by a resistor is proportional to the current squared. With the same semiconductor fabrication process, the area occupied by R2 is $(N+1)/N^2$ of the area occupied by R1. The circuit shown in FIG. 3 can significantly reduce the area of the compensation resistor R2, thereby reducing the cost of the LDO regulator.

In accordance with an embodiment, the transistors M1 and M2 may be MOSFET devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted that the diagram shown in FIG. 3 is merely an example, which should not unduly limit the scope of the claims. One of ordinary skill in the art would recognize many variations, alternatives, and modifications. For example, M1 can be implemented as an n-type transistor. In response to this change, the non-inverting input of the error amplifier EA is configured to receive the reference VREF. The non-inverting input of the error amplifier EA is configured to detect the output voltage of the LDO regulator.

It should further be noted that FIG. 3 illustrates only one transistor of the LDO regulator that may include a plurality of transistors. The single transistor illustrated herein is limited solely for the purpose of clearly illustrating the inventive aspects of the various embodiments. The present disclosure is not limited to any specific number of transistors. Depending on different needs, the single transistor shown in FIG. 3 may be replaced by a plurality of transistors connected in parallel.

One advantageous feature of the LDO regulator shown in FIG. 3 is that the compensation circuit can realize the same compensation function of the traditional compensation circuit shown in FIG. 2, but the required resistance value of the compensation circuit can be significantly greater than that of the traditional compensation circuit. In addition, the current flowing through R2 is much smaller than the current flowing through R1. As a result, the area occupied by the compensation circuit integrated into the chip can be reduced, thereby reducing the cost of the chip.

Figure 4:
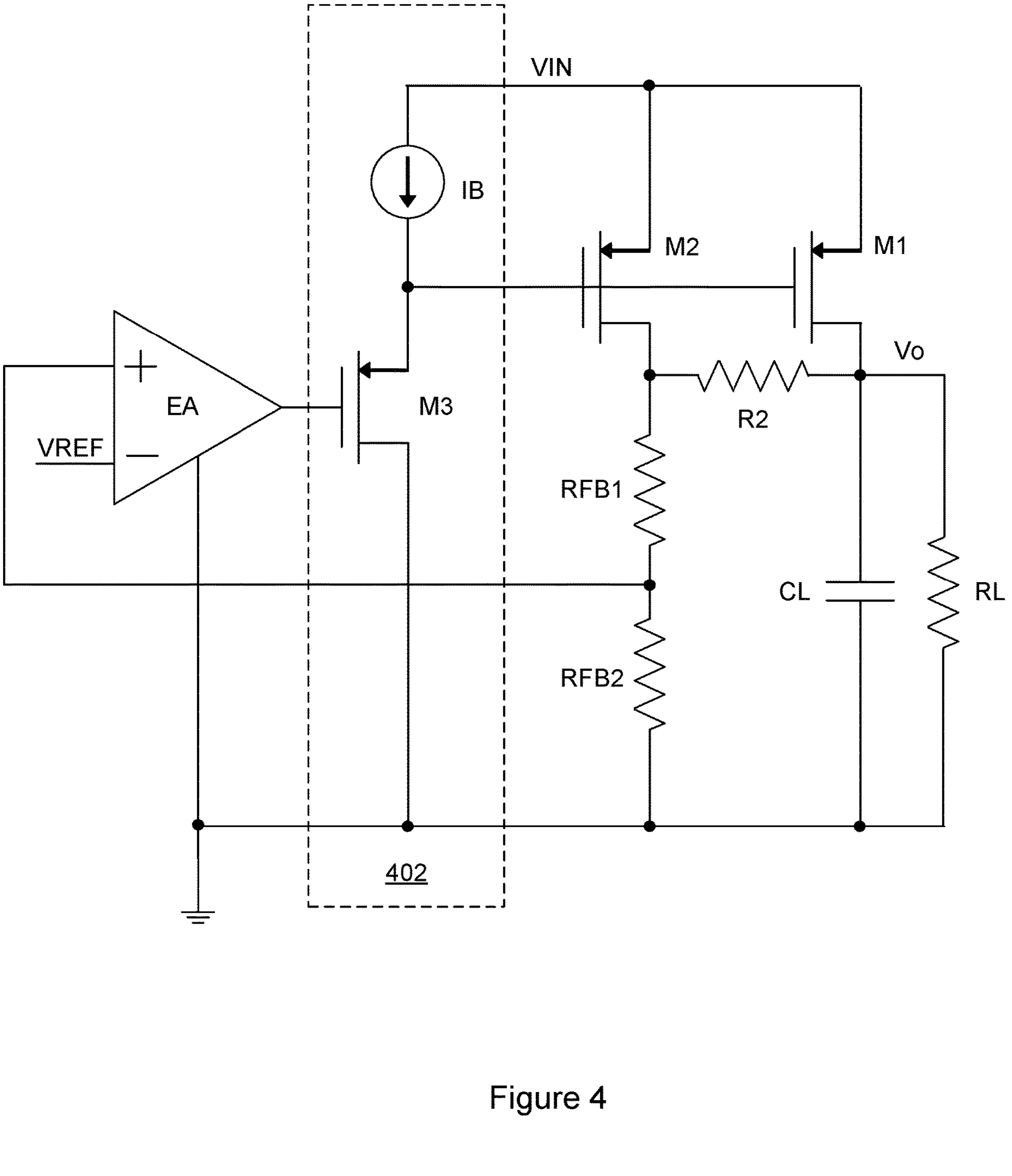
FIG. 4 illustrates a schematic diagram of a second implementation of an LDO regulator and its associated control apparatus in accordance with various embodiments of the present disclosure.

FIG. 4 illustrates a schematic diagram of a second implementation of an LDO regulator and its associated control apparatus in accordance with various embodiments of the present disclosure. The second implementation of the LDO regulator shown in FIG. 4 is similar to that shown in FIG. 3 except that a buffer stage is employed to improve the drive capability of the error amplifier.

As shown in FIG. 4, the buffer stage 402 is coupled between the output of the error amplifier EA and the gates of the first transistor M1 and the second transistor M2. The buffer stage 402 comprises a current source IB and a third transistor M3 connected in series between the input terminal VIN and ground. The output of the error amplifier EA is connected to the gate of the third transistor M3. The gates of the first transistor M1 and the second transistor M2 are connected together and further connected to a common node of the current source IB and the third transistor M3. In operation, the buffer stage 402 is configured to enhance drive capability of the error amplifier EA, thereby increasing response speed.

It should be noted the first pole of the LDO regulator shown in FIG. 4 is different from the first pole of the LDO regulator shown in FIG. 3. In particular, the first pole of the LDO regulator is formed by the output resistance of the buffer stage 402 and the input capacitance of the first transistor M1. In operation, the resistor R2 and the output capacitor CL form a zero to compensate the first pole of the LDO regulator shown in FIG. 4.

Figure 5:
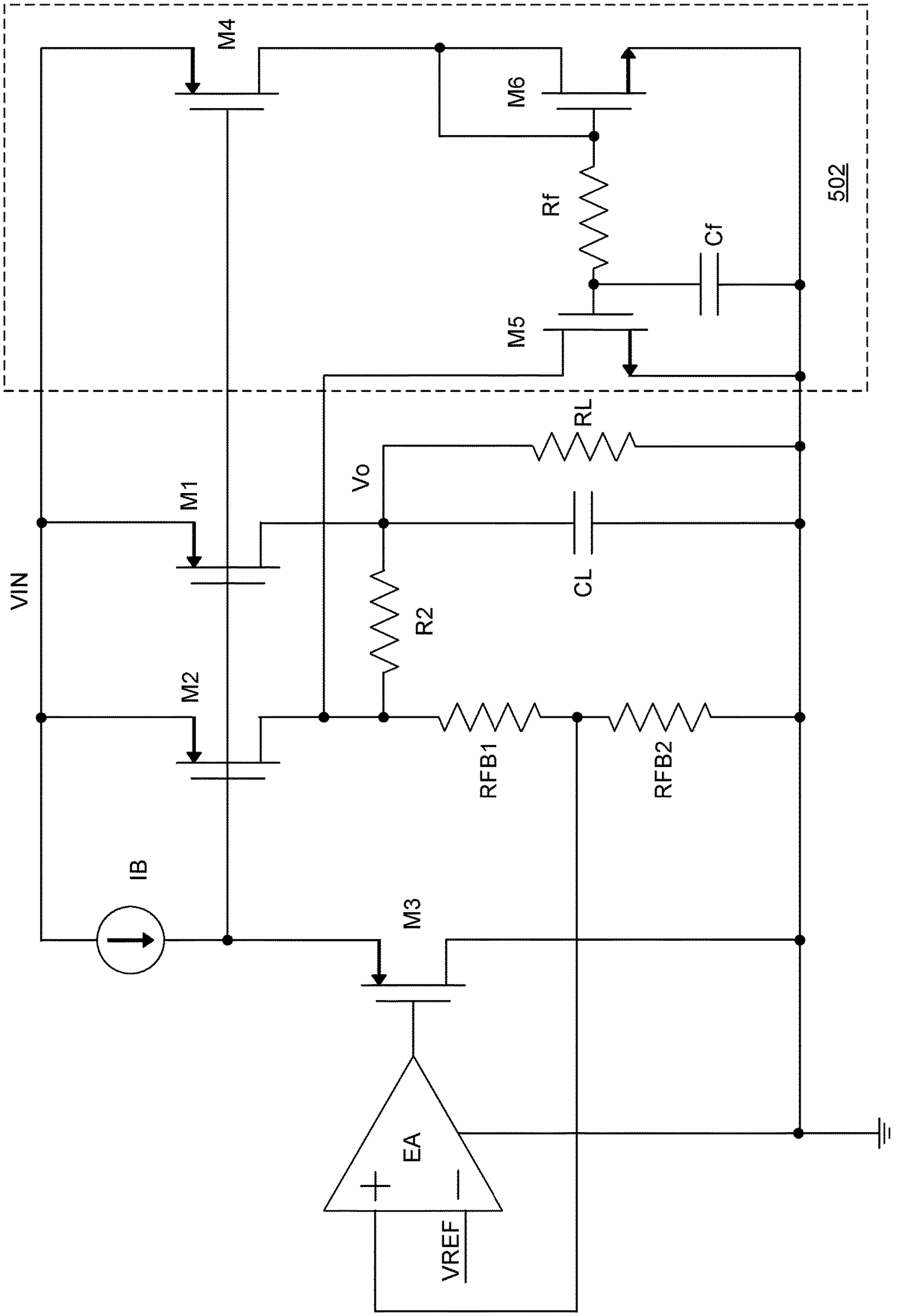
FIG. 5 illustrates a schematic diagram of a third implementation of an LDO regulator and its associated control apparatus in accordance with various embodiments of the present disclosure.

FIG. 5 illustrates a schematic diagram of a third implementation of an LDO regulator and its associated control apparatus in accordance with various embodiments of the present disclosure. The third implementation of the LDO regulator shown in FIG. 5 is similar to that shown in FIG. 4 except that a current bypass circuit is employed to improve the regulation accuracy of the feedback loop.

The current bypass circuit 502 is coupled to a common node of the second transistor M2 and the resistor R2. The current bypass circuit 502 is configured to bypass a dc current flowing through the resistor R2. As shown in FIG. 5, the current bypass circuit 502 comprises a current mirror and a filter.

The current mirror comprises a fourth transistor M4, a fifth transistor M5 and a sixth transistor M6. As shown in FIG. 5, a source of the fourth transistor M4 is connected to the sources of the first transistor M1 and the second transistor M2. A gate of the fourth transistor M4 is connected to the gates of the first transistor M1 and the second transistor M2. A drain of the fourth transistor M4 is connected to a drain of the sixth transistor M6.

A drain of the fifth transistor M5 is connected to the drain of the second transistor M2. The sources of the fifth transistor M5 and the sixth transistor M6 are connected are connected to ground. The gate of the fifth transistor M5 is connected to the filter. The gate of the sixth transistor M6 is connected to the drain of the sixth transistor M6.

The filter comprises a filter resistor Rf and a filter capacitor Cf. As shown in FIG. 5, the filter resistor Rf is connected between the gate of the fifth transistor M5 and the gate of the sixth transistor M6. The filter capacitor Cf is connected between the gate of the fifth transistor M5 and ground.

As shown in FIG. 5, the gate of the transistor M3 is connected to the gate of the transistor M4. The source of the transistor M3 is connected to the source of the transistor M4. In addition, the size of the transistor M3 is equal to the size of the transistor M4. As such, the dc current flowing through the transistor M3 is mirrored to the transistor M4 with a ratio of 1:1. The dc current continues to be mirrored to M5 through a pair formed by transistors M5 and M6. As shown in FIG. 5, the drain of the transistor M5 is connected to the drain of the transistor M2. In this way, the dc current flowing through the transistor M2 is all drawn away by the transistor M5. There is no more dc current flowing through R2. Since there is no more dc voltage drop across R2, the output terminal Vo and the feedback loop sampling node (the drain of M2) are dc short-circuited. In this way, the output voltage error caused by the compensation resistor R2 is avoided.

Alternatively, in some embodiments, the current mirror is configured such that the ratio of the size of M2 to the size of M4 is the same as the ratio of the size of M5 to the size of M6. Under this configuration, although the dc current flowing through M4 is different from the dc current flowing through M2, the dc current drawn by M5 still bypasses the dc current flowing through M2.

In some embodiments, the filter formed by Rf and Cf functions as a low-pass filter to filter out the ac signal applied to the gates of M5 and M6, so that the entire current mirror circuit does not participate in the ac response of the LDO regulator. Through selecting appropriate parameters of the low-pass filter, a dc component of a current flowing through the second transistor M2 flows through the fifth transistor M5. An ac component of the current flowing through the second transistor M2 flows through the resistor R2. In this way, the transfer function of the original compensation circuit shown in FIG. 2 remains unchanged. The addition of the filter circuit uses the current mirror circuit to eliminate the output voltage error of the original LDO circuit while completely maintaining the compensation characteristics of the zero brought by the resistor R2.

Figure 6:
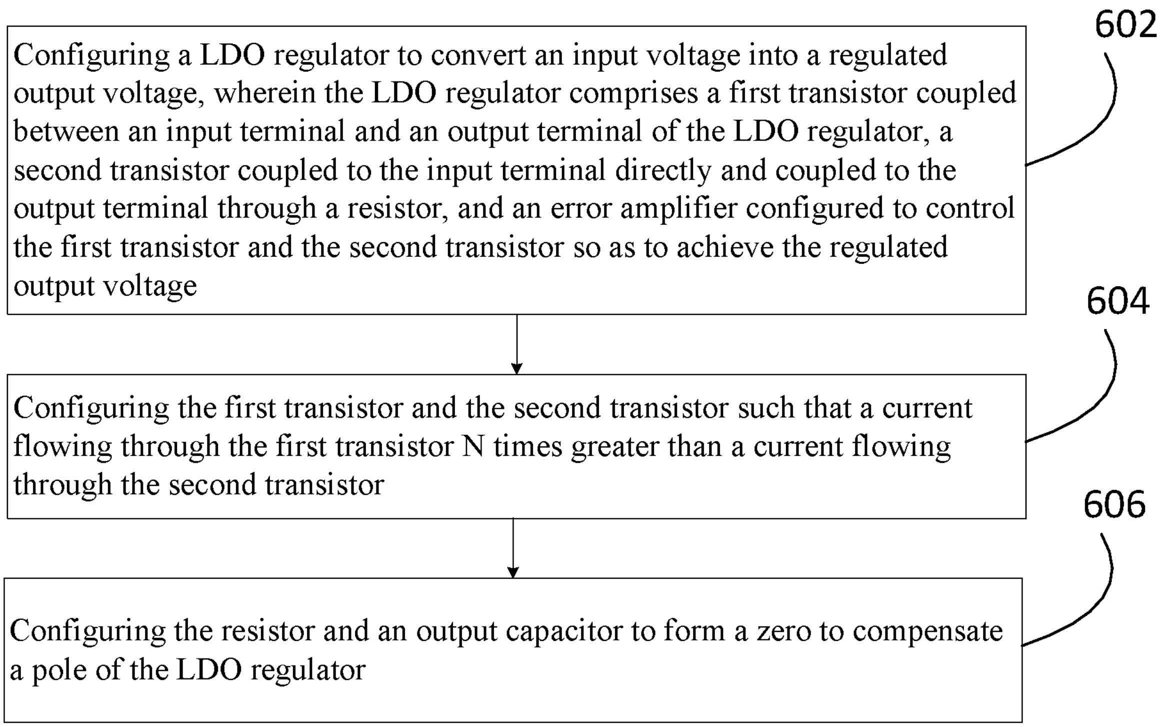
FIG. 6 illustrates a flow chart of a control method for operating the LDO regulator shown in FIG. 3 in accordance with various embodiments of the present disclosure.

FIG. 6 illustrates a flow chart of a control method for operating the LDO regulator shown in FIG. 3 in accordance with various embodiments of the present disclosure. This flowchart shown in FIG. 6 is merely an example, which should not unduly limit the scope of the claims. One of ordinary skill in the art would recognize many variations, alternatives, and modifications. For example, various steps illustrated in FIG. 6 may be added, removed, replaced, rearranged and repeated.

Referring back to FIG. 3, an LDO regulator comprises a first transistor and a second transistor. The first transistor is connected between an input terminal VIN and an output terminal Vo of the LDO regulator. The second transistor is connected between the input terminal VIN and a voltage divider. A compensation resistor is connected between the output terminal Vo and the voltage divider. The size of the first transistor is much greater than the size of the second transistor. More particularly, a ratio of the size of the first transistor to the size of the second transistor is equal to N:1. N is a predetermined number greater than 1.

At step 602, the LDO regulator is configured to convert an input voltage into a regulated output voltage. The LDO regulator comprises a first transistor coupled between an input terminal and an output terminal of the LDO regulator, a second transistor coupled to the input terminal directly and coupled to the output terminal through a resistor, and an error amplifier configured to control the first transistor and the second transistor so as to achieve the regulated output voltage.

At step 604, the first transistor and the second transistor are configured such that a current flowing through the first transistor is N times greater than a current flowing through the second transistor.

At step 606, the resistor and an output capacitor are configured to form a zero to compensate a pole of the LDO regulator.

A source of the first transistor is coupled to the input terminal of the LDO regulator. A drain of the first transistor is coupled to the output terminal of the LDO regulator. A source of the second transistor is coupled to the input terminal of the LDO regulator. A drain of the first transistor is coupled to the output terminal of the LDO regulator through the resistor. An inverting input of the error amplifier is configured to receive a reference. A non-inverting input of the error amplifier is configured to detect an output voltage of the LDO regulator through a voltage divider. An output of the error amplifier is connected to a gate of the first transistor and a gate of the second transistor.

The method further comprises enhancing drive capability of the error amplifier through coupling a buffer stage between an output of the error amplifier and gates of the first transistor and the second transistor.

The buffer stage comprises a current source and a third transistor connected in series between the input terminal of the LDO regulator and ground. The output of the error amplifier is connected to a gate of the third transistor. The gates of the first transistor and the second transistor are connected together and further connected to a common node of the current source and the third transistor.

The method further comprises bypassing a dc current flowing through the resistor through coupling a current bypass circuit to a common node of the second transistor and the resistor.

The current bypass circuit comprises a current mirror and a filter. The current mirror comprises a fourth transistor, a fifth transistor and a sixth transistor. A source of the fourth transistor is connected to sources of the first transistor and the second transistor. A gate of the fourth transistor is connected to the gates of the first transistor and the second transistor. A drain of the fourth transistor is connected to a drain of the sixth transistor. A drain of the fifth transistor is connected to a drain of the second transistor. A gate of the sixth transistor is connected to the drain of the sixth transistor. Sources of the fifth transistor and the sixth transistor are connected are connected to ground. The filter comprises a filter resistor and a filter capacitor. The filter resistor is connected between a gate of the fifth transistor and the gate of the sixth transistor. The filter capacitor is connected between the gate of the fifth transistor and ground.

The method further comprises configuring the filter resistor and the filter capacitor such that a dc component and an ac component of a current flowing through the second transistor flow through the fifth transistor and the resistor, respectively.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:

a first transistor having a first drain/source terminal coupled to an input terminal of a regulator, and a second drain/source terminal coupled to an output terminal of the regulator;

a second transistor having a first drain/source terminal coupled to the input terminal of the regulator, and a second drain/source terminal coupled to the output terminal of the regulator through a resistor, and wherein the second drain/source terminal of the second transistor is connected to ground through a voltage divider;

an error amplifier having an inverting input configured to receive a reference, a non-inverting input connected to the second drain/source terminal of the second transistor through the voltage divider, and an output coupled to gates of the first transistor and the second transistor, and wherein the resistor and the voltage divider are connected in series between the output terminal of the regulator and ground, and a midpoint of the voltage divider is connected to the non-inverting input of the error amplifier; and an output capacitor coupled between the output terminal of the regulator and ground, wherein the resistor and the output capacitor form a zero to compensate a pole of the regulator, and wherein the pole of the regulator is formed by an output resistance of a stage coupled to the gate of the first transistor and an input capacitance of the first transistor, and wherein a ratio of a size of the first transistor to a size of the second transistor is equal to (N:1), and wherein as a result of having the first transistor N times greater than the second transistor, a frequency of the zero is inversely proportional to a capacitance value of the output capacitor times a resistance value of the resistor divided by (N+1).

2. The apparatus of claim 1, wherein:

a ratio of a current flowing through the first transistor to a current flowing through the second transistor is (N:1), and wherein N is a predetermined number greater than 1.

3. The apparatus of claim 1, wherein:

the first transistor is a first p-type transistor having a source coupled to the input terminal of the regulator, and a drain coupled to the output terminal of the regulator;

the second transistor is a second p-type transistor having a source coupled to the input terminal of the regulator, and a drain coupled to the output terminal of the regulator through the resistor; and the non-inverting input of the error amplifier is configured to detect the output voltage of the regulator through the voltage divider.

4. The apparatus of claim 1, further comprising:

a buffer stage coupled between the output of the error amplifier and the gates of the first transistor and the second transistor, wherein the buffer stage comprises:

a current source and a third transistor connected in series between the input terminal of the regulator and ground, and wherein:

the output of the error amplifier is connected to a gate of the third transistor; and the gates of the first transistor and the second transistor are connected together and further connected to a common node of the current source and the third transistor, and wherein the buffer stage is configured to enhance drive capability of the error amplifier, thereby increasing response speed.

5. The apparatus of claim 1, further comprising:

a current bypass circuit coupled to a common node of the second transistor and the resistor, wherein the current bypass circuit is configured to bypass a dc current flowing through the resistor.

6. The apparatus of claim 5, wherein the current bypass circuit comprises a current mirror and a filter, and wherein:

the current mirror comprises a fourth transistor, a fifth transistor and a sixth transistor, and wherein:

a source of the fourth transistor is connected to sources of the first transistor and the second transistor;

a gate of the fourth transistor is connected to the gates of the first transistor and the second transistor;

a drain of the fourth transistor is connected to a drain of the sixth transistor;

a drain of the fifth transistor is connected to a drain of the second transistor;

a gate of the sixth transistor is connected to the drain of the sixth transistor; and sources of the fifth transistor and the sixth transistor are connected to ground; and the filter comprises a filter resistor and a filter capacitor, and wherein:

the filter resistor is connected between a gate of the fifth transistor and the gate of the sixth transistor; and the filter capacitor is connected between the gate of the fifth transistor and ground.

7. The apparatus of claim 6, wherein the filter is configured such that:

a dc component of a current flowing through the second transistor flows through the fifth transistor; and an ac component of the current flowing through the second transistor flows through the resistor.

8. A method comprising:

configuring a low dropout (LDO) regulator to convert an input voltage into a regulated output voltage, wherein the LDO regulator comprises:

a first transistor coupled between an input terminal and an output terminal of the LDO regulator;

a second transistor coupled to the input terminal directly and coupled to the output terminal through a resistor, wherein a drain/source terminal of the second transistor is connected to ground through a voltage divider; and an error amplifier configured to control the first transistor and the second transistor so as to achieve the regulated output voltage, wherein an inverting input of the error amplifier is configured to receive a reference, a non-inverting input of the error amplifier is connected to the drain/source terminal of the second transistor through the voltage divider, and an output of the error amplifier is coupled to gates of the first transistor and the second transistor, and wherein the resistor and the voltage divider are connected in series between the output terminal of the LDO regulator and ground, and a midpoint of the voltage divider is connected to the non-inverting input of the error amplifier;

configuring the first transistor and the second transistor such that a current flowing through the first transistor is N times greater than a current flowing through the second transistor; and configuring the resistor and an output capacitor to form a zero to compensate a pole of the LDO regulator, wherein as a result of having the current flowing through the first transistor N times greater than the current flowing through the second transistor, a frequency of the zero is inversely proportional to a capacitance value of the output capacitor times a resistance value of the resistor divided by (N+1).

9. The method of claim 8, wherein:

a source of the first transistor is coupled to the input terminal of the LDO regulator;

a drain of the first transistor is coupled to the output terminal of the LDO regulator;

a source of the second transistor is coupled to the input terminal of the LDO regulator;

a drain of the second transistor is coupled to the output terminal of the LDO regulator through the resistor;

the non-inverting input of the error amplifier is configured to detect the regulated output voltage of the LDO regulator through the voltage divider; and the output of the error amplifier is connected to a gate of the first transistor and a gate of the second transistor.

10. The method of claim 8, further comprising:

enhancing drive capability of the error amplifier through coupling a buffer stage between the output of the error amplifier and gates of the first transistor and the second transistor.

11. The method of claim 10, wherein the buffer stage comprises:

a current source and a third transistor connected in series between the input terminal of the LDO regulator and ground, and wherein:

the output of the error amplifier is connected to a gate of the third transistor; and the gates of the first transistor and the second transistor are connected together and further connected to a common node of the current source and the third transistor.

12. The method of claim 8, further comprising:

bypassing a dc current flowing through the resistor through coupling a current bypass circuit to a common node of the second transistor and the resistor.

13. The method of claim 12, wherein the current bypass circuit comprises a current mirror and a filter, and wherein:

the current mirror comprises a fourth transistor, a fifth transistor and a sixth transistor, and wherein:

a source of the fourth transistor is connected to sources of the first transistor and the second transistor;

a gate of the fourth transistor is connected to the gates of the first transistor and the second transistor;

a drain of the fourth transistor is connected to a drain of the sixth transistor;

a drain of the fifth transistor is connected to a drain of the second transistor;

a gate of the sixth transistor is connected to the drain of the sixth transistor; and sources of the fifth transistor and the sixth transistor are connected to ground; and the filter comprises a filter resistor and a filter capacitor, and wherein:

the filter resistor is connected between a gate of the fifth transistor and the gate of the sixth transistor; and the filter capacitor is connected between the gate of the fifth transistor and ground.

14. The method of claim 13, further comprising:

configuring the filter resistor and the filter capacitor such that a dc component and an ac component of a current flowing through the second transistor flow through the fifth transistor and the resistor, respectively.

15. A regulator comprising:

a first transistor having a source coupled to an input terminal of the regulator, and a drain coupled to an output terminal of the regulator;

a second transistor having a source coupled to the input terminal of the regulator, and a drain coupled to the output terminal of the regulator through a resistor, wherein the drain is connected to ground through a voltage divider;

an output capacitor coupled between the output terminal of the regulator and ground, wherein the resistor and the output capacitor form a zero to compensate a pole of the regulator; and an error amplifier having an inverting input configured to receive a reference, a non-inverting input connected to the drain of the second transistor through the voltage divider, and an output coupled to gates of the first transistor and the second transistor, wherein the resistor and the voltage divider are connected in series between the output terminal of the regulator and ground, and a midpoint of the voltage divider is connected to the non-inverting input of the error amplifier wherein a ratio of a size of the first transistor to a size of the second transistor is equal to (N:1), and wherein as a result of having the first transistor N times greater than the second transistor, a frequency of the zero is inversely proportional to a capacitance value of the output capacitor times a resistance value of the resistor divided by (N+1).

16. The regulator of claim 15, further comprising:

a buffer stage coupled between the output of the error amplifier and the gates of the first transistor and the second transistor, wherein the buffer stage is configured to enhance drive capability of the error amplifier, and wherein the buffer stage comprises a current source and a third transistor connected in series between the input terminal of the regulator and ground, and wherein:

the output of the error amplifier is connected to a gate of the third transistor; and the gates of the first transistor and the second transistor are connected together and further connected to a common node of the current source and the third transistor.

17. The regulator of claim 15, further comprising a current bypass circuit coupled to a common node of the second transistor and the resistor, wherein the current bypass circuit is configured to bypass a de current flowing through the resistor, and wherein the current bypass circuit comprises a current mirror and a filter, and wherein:

the current mirror comprises a fourth transistor, a fifth transistor and a sixth transistor, and wherein:

a source of the fourth transistor is connected to sources of the first transistor and the second transistor;

a gate of the fourth transistor is connected to the gates of the first transistor and the second transistor;

a drain of the fourth transistor is connected to a drain of the sixth transistor;

a drain of the fifth transistor is connected to a drain of the second transistor;

a gate of the sixth transistor is connected to the drain of the sixth transistor; and sources of the fifth transistor and the sixth transistor are connected to ground; and the filter comprises a filter resistor and a filter capacitor, and wherein:

the filter resistor is connected between a gate of the fifth transistor and the gate of the sixth transistor; and the filter capacitor is connected between the gate of the fifth transistor and ground.

* * * * *